(12) United States Patent
Yuan et al.

(10) Patent No.: US 7,638,101 B2
(45) Date of Patent: Dec. 29, 2009

(54) REGENERATION METHOD WITH EFFICIENT OXYGEN UTILIZATION

(75) Inventors: Leon Yuan, Taipei (TW); James L. Bixby, Rolling Meadows, IL (US); Kyle P. Austin, Algonquin, IL (US); Brian D. Nabozny, Sleepy Hollow, IL (US)

(73) Assignee: UOP LLC, Des Plaines, IL (US)

( * ) Notice: Subject to any disclaimer, the term of this patent is extended or adjusted under 35 U.S.C. 154(b) by 446 days.

(21) Appl. No.: 11/755,940

(22) Filed: May 31, 2007

(65) Prior Publication Data

US 2007/0217961 A1  Sep. 20, 2007

Related U.S. Application Data

(62) Division of application No. 10/750,292, filed on Dec. 31, 2003, now Pat. No. 7,312,173.

(51) Int. Cl.
```
G05D 23/00    (2006.01)
G05D 7/00     (2006.01)
F27B 15/08    (2006.01)
B01J 8/08     (2006.01)
B01J 23/90    (2006.01)
```

(52) U.S. Cl. .................. 422/109; 422/108; 422/110; 422/111; 422/144; 422/145; 422/146; 422/213; 422/223

(58) Field of Classification Search ........... 422/108, 422/109, 110, 111, 144, 145, 146, 213, 223
See application file for complete search history.

(56) References Cited

U.S. PATENT DOCUMENTS

| | | | |
|---|---|---|---|
| 3,652,231 A | 3/1972 | Greenwood et al. | 23/288 G |
| 3,753,926 A | 8/1973 | Hayes | 252/415 |
| 4,119,526 A | 10/1978 | Peters et al. | 208/64 |
| 4,409,095 A | 10/1983 | Peters | 208/134 |
| 4,440,626 A | 4/1984 | Winter et al. | 208/65 |
| 4,507,397 A | 3/1985 | Buss | 502/38 |
| 4,810,683 A | 3/1989 | Cohn et al. | 502/37 |
| 4,859,643 A | 8/1989 | Sechrist et al. | 502/37 |
| 5,001,095 A | 3/1991 | Sechrist | 502/41 |
| 5,151,392 A | 9/1992 | Fettis et al. | 502/37 |
| 5,155,075 A | 10/1992 | Innes et al. | 502/52 |
| 5,854,162 A | 12/1998 | Dufresne et al. | 502/45 |
| 5,965,473 A | 10/1999 | Sechrist et al. | 502/35 |
| 6,103,652 A | 8/2000 | Brunet et al. | 502/37 |

*Primary Examiner*—Walter D Griffin
*Assistant Examiner*—Lessanework Seifu
(74) *Attorney, Agent, or Firm*—Maryann Maas

(57) ABSTRACT

This invention relates to regeneration of coked catalyst by combustion so that the catalyst can be reused in a hydrocarbon conversion reaction. The completion of coke burn is generally measured with a combination of temperature or change in oxygen concentration. Dropping outlet temperatures require time to wait for increases in inlet temperature to correspondingly move down the regenerator. Faster response times might be expected from increasing oxygen concentration, but a small increase in concentration can lead to a significant increase in peak burn temperature which negatively impacts catalyst life. Controlled peak burning is difficult over the entire bed by merely controlling inlet and outlet oxygen concentrations. The invention accordingly combines a measured lag time for temperature travel with an inlet temperature ramping step to ensure complete coke combustion with high oxygen efficiency, thus providing a rapid regeneration that permits more time for operation at desired reaction conditions.

10 Claims, 4 Drawing Sheets

REGENERATION METHOD WITH EFFICIENT OXYGEN UTILIZATION

CROSS-REFERENCE TO RELATED APPLICATION

This application is a Division of copending application Ser. No. 10/750,292 filed Dec. 31, 2003, the contents of which are hereby incorporated by reference in its entirety.

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BACKGROUND OF THE INVENTION

Catalytic processes for the conversion of hydrocarbons are well known and extensively used. Invariably the catalysts used in these processes become deactivated for one or more reasons. Where the accumulation of coke deposits causes the deactivation, reconditioning of the catalyst to remove coke deposits restores the activity of the catalyst. Coke is normally removed from catalyst by contact of the coke-containing catalyst at high temperature with an oxygen-containing gas to combust and to remove the coke in a regeneration process. These processes can be carried out in-situ within a fixed-bed or the catalyst may be removed from a vessel in which the hydrocarbon conversion takes place and transported to a separate regeneration zone for coke removal. Arrangements for continuously or semi-continuously removing catalyst particles from a reaction zone and for coke removal in a regeneration zone are well known.

In a continuous or semi-continuous regeneration process, coke laden particles are at least periodically added and withdrawn from a bed of catalyst in which the coke is combusted. In those processes having an essentially linear progression of catalyst particles through the bed and a transverse flow of oxidizing gas coke combustion, there are regions of intense burning that extend through portions of the catalyst bed.

In a fixed-bed or batch process, coke laden particles are likewise subjected to a flow of oxidizing gas, but the gas is flowed axially through the bed instead of the particles being flowed through the gas. Similarly, there is a region of intense burning as gas travels down the bed with rising temperature as oxygen in the gas is consumed.

These regions of intense burning are important for complete coke removal, but are also difficult to control in a time efficient manner. Typically coke removal takes a significant amount of time to complete. Any extra time used to ensure complete combustion leads to production losses in an existing regenerator unit with less available reconditioned catalyst, which would otherwise be used for valuable hydrocarbon conversion reactions. Investment losses also occur for oversized equipment built at a larger size than necessary for a new regenerator unit.

For a fixed-bed regeneration process, the completion of coke burn is generally measured with a combination of bed temperature or change in oxygen concentration. Once satisfactory burn criteria have been met, a proof burn is conducted by increasing the regenerator temperature or the oxygen concentration. However, the measurement of the parameters outside the regenerator to set criteria for end of burn require scrutiny in order to avoid regenerator outlet temperature dropping below the peak burn temperature or outlet oxygen concentration increasing, which reflects dropping oxygen utilization. Dropping outlet temperatures require additional lag time to wait for increases in inlet temperature to correspondingly move down the regenerator.

Faster response times can be expected from increasing oxygen concentration, but a small increase in concentration can lead to a significant increase in peak burn temperature. Some beds have low flow areas where oxygen in the effluent can increase, while the low flow area continues to consume all of the available oxygen, thus making controlled peak burning difficult over the entire bed by merely controlling inlet and outlet oxygen concentrations.

Another problem associated with localized regions of intense coke combustion is catalyst deactivation. Exposure of high surface area catalyst to high temperatures for prolonged periods of time will create a more amorphous material having a reduced surface area which in turn lowers the activity of the catalyst until it reaches a level where it is considered deactivated. Deactivation of this type is permanent, thereby rendering the catalyst unusable. When moisture is present—water is a by-product of the coke combustion—the deactivating effects of high temperature exposure are compounded.

The combination of temperature, water vapor, and exposure time determine useful life of the catalyst. The burning of coke in localized portions of a catalyst bed has the deleterious effect of heating gases and generating moisture that pass through downstream portions of the bed and extend the high temperature exposure time of catalyst particles in the bed.

U.S. Pat. No. 3,753,926 discloses a method for regenerating a hydrocarbon conversion catalyst comprising rhenium using two carbon burning steps, where the first step is at a relatively low temperature with a small amount of oxygen and the second step is at a relatively higher temperature and a relatively higher amount of oxygen.

U.S. Pat. No. 4,507,397 discloses a sulfur removal step in a semi-continuous regeneration process prior to carbonaceous deposit oxidation. U.S. Pat. No. 4,810,683 discloses a method for regenerating a platinum containing zeolite. U.S. Pat. No. 5,155,075 discloses a low temperature method for regeneration of a platinum containing zeolite that uses a halogen-free oxygen gas.

U.S. Pat. No. 4,859,643 discloses a method for regenerating coke-contaminated catalyst particles that confines particles in the combustion section of a regenerator zone to a tapered bed configuration, which achieves better utilization of oxygen and minimizes surface area loss of the catalyst. This patent ('643) is hereby incorporated by reference into this patent application.

U.S. Pat. No. 5,001,095 discloses a method for improving a coke combustion process by segregating flue gas from the process into a high moisture content portion that is removed and a low moisture content portion that is recycled to the process.

U.S. Pat. No. 5,151,392 discloses a moving bed regeneration process with separate dispersion and chloriding steps following a coke combustion zone, which allows improved platinum re-dispersion by controlling chloride equilibrium with either oxygen-enriched or oxygen-depleted environments.

U.S. Pat. No. 5,854,162 discloses an offsite regeneration process using a moving bed furnace for a combustion step similar for used hydro-treatment catalysts, and adds a oxy-halogenation step in a sealed rotating furnace that avoids the onset of gas channeling, which improves the homogeneity of catalyst halogenation.

U.S. Pat. No. 5,965,473 discloses a method for reducing chloride emissions from a cyclic regeneration operation while saving operating costs.

U.S. Pat. No. 6,103,652 discloses a staged combustion process and apparatus for regenerating a catalyst in a moving bed that includes at least two separate successive combustion zones.

SUMMARY OF THE INVENTION

Ways are always sought to improve the effectiveness and economics of regeneration systems, such that catalyst regeneration time is minimized while catalyst reaction time is maximized. Accordingly, one embodiment of the present invention is a method for achieving increased burning efficiency of catalyst coke deposits by determining a lag time to use with increasing inlet temperatures during a temperature ramping step occurring as coke combusts in a catalyst bed.

In another embodiment of the present invention, a ramp rate is iteratively determined by allowing the first cycle to occur without ramping, then using the empirical information to set a time based on when the previous cycle coke burn completes.

In yet another embodiment of the present invention, an apparatus system uses a heater and at least two vessels for reaction and regeneration to conduct coke combustion from catalyst particles. A measurement device is used in conjunction with a control device to permit a lag time to compensate for temperature ramping in a beneficial manner.

Additional objects, embodiments and details of this invention can be obtained from the following detailed description of the invention.

DETAILED DESCRIPTION OF THE INVENTION

Figure 6:
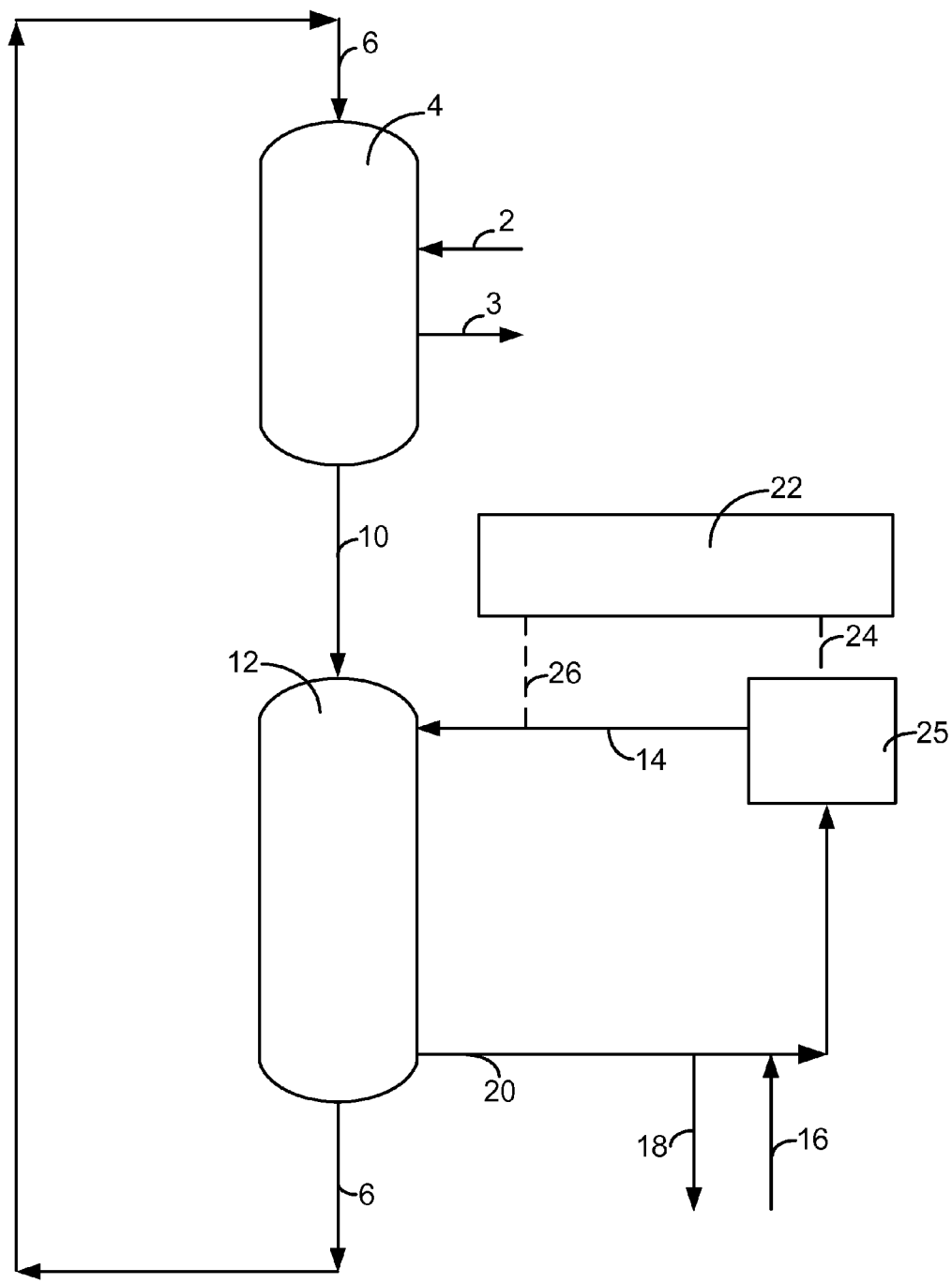
FIG. 6 shows a general schematic of the apparatus of the invention.

The present invention is applicable to a number of hydrocarbon conversion processes which utilize a catalyst and are generally depicted by FIG. 6. For example, it is useful in the isomerization of normal butane to isobutane and the isomerization of mixed $C_8$ aromatics, including those of high ethylbenzene content, to meta-xylene or para-xylene. The present invention may also be used in upgrading light straight run naphtha, which is a mixture rich in $C_5$ and $C_6$ paraffins (pentanes and hexanes), to the corresponding branched isomers, which have higher octane numbers than the feed naphtha. Another hydrocarbon conversion process in which the present invention may be used is dehydrogenation of light paraffins ($C_2$ to $C_5$, but primarily $C_3$ and $C_4$) to the corresponding olefins.

However, the most widely practiced hydrocarbon conversion process to which the present invention is applicable is catalytic reforming. Therefore the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require extensive description herein.

Briefly, in catalytic reforming, a feedstock (2) is admixed with a recycle stream comprising hydrogen and contacted with catalyst in a reaction zone (4). The usual feedstock for catalytic reforming is a petroleum fraction known as naphtha and having an initial boiling point of about 82° C. (180° F.) and an end boiling point of about 204° C. (400° F.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. No. 4,119,526; U.S. Pat. No. 4,409,095; and U.S. Pat. No. 4,440,626.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. Alumina is a commonly used carrier. The halogen is normally chlorine. The particles are usually spheroidal but may be cylindrical, and have a diameter of from about 1.5 mm to about 3.1 mm ($\frac{1}{16}$-inch to about $\frac{1}{8}$-inch), though they may be as large as 6.55 mm ($\frac{1}{4}$-inch). In a particular regenerator, however, it is desirable to use catalyst particles which fall in a relatively narrow size range. During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

The present invention is applicable to a moving bed regeneration zone and a fixed bed regeneration zone. Fresh catalyst particles (6) are placed in a reaction zone (4), which may be comprised of several subzones. Catalyst may be withdrawn from the bottom of the reaction zone and transported (10) to a regeneration zone (12) where a hereinafter described multi-step or multi-section regeneration process is used to recondition the catalyst to restore its full reaction promoting ability. Catalyst flows by gravity through the regeneration zone, and then is withdrawn (6) and furnished to the reaction zone (4) Catalyst may flow through successive steps or sections, or successive steps may be applied to a non-flowing section of catalyst. Similarly, a fixed bed or batch reaction zone may be switched into a regenerator zone by applying successive steps to a non-moving catalyst bed.

When using the method of this invention in a batch, continuous, or semi-continuous catalyst regeneration process, catalyst is contacted with a hot oxygen-containing gas stream (14) (known in reforming processes as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation mainly to carbon dioxide and water. Coke content of spent catalyst may be as much as 20% of the catalyst weight, but 5 to 7% is a more typical amount. Within the combustion step or section, coke is usually oxidized at temperatures ranging from about 371° to about 550° C. (700° to 1020° F.), but temperatures in localized regions may reach as low as 200° C. (392° F.) and as high as 600° C. (1112° F.) or more. It is preferred to not greatly exceed 600° C. (1112° F.).

Oxygen (16) for the combustion of coke enters the combustion step of the regeneration zone in what has been termed a recycle gas. The recycle gas contains a low concentration of oxygen usually on the order of 0.2 to 3.0% by volume. The arrangement of a typical combustion section for a continuous regeneration zone may be seen in U.S. Pat. No. 3,652,231. The arrangement for a batch regenerator zone may be seen by description in U.S. Pat. No. 5,965,473 which describes an off-stream catalyst bed of a reforming process with cyclic catalyst regeneration. Such a batch regenerator zone contains catalyst particles in an elongated bed having two elongated sides. In one common arrangement, the two elongated sides are open for transverse gas flow through the catalyst bed. In another common arrangement, the elongated bed has two ends, which are generally perpendicular to the elongated sides and which are open for axial gas flow through the bed. If the arrangement is a cylinder, then it will only have one elongated side.

As the coke is combusted, the small amount of hydrogen within the coke reacts with the oxygen to form water. Flue gas made up of carbon monoxide, carbon dioxide, water and un-reacted oxygen (if any) and other non-reactive gases are collected from the combustion section and withdrawn from the regeneration zone as flue gas (20). Thus, the recycle gas and flue gas form a recycle gas loop wherein flue gas is continually withdrawn from the process mixed with an oxygen-containing gas to replenish consumed oxygen and returned to the combustion section as recycle gas. A small amount of the flue gas is vented (18) off from the process to allow the addition of an oxygen-containing gas called make-up gas (16). The oxygen-containing gas is combined with the flue gas to replace the oxygen consumed by the coke combustion and the combined gas is recycled to the combustion step or section. In the past, the oxygen-containing gas was typically air. The amount of air needed to replenish the oxygen consumed during the coke combustion is relatively small, about 3% of the volumetric rate of the recycle gas stream depending upon actual inlet oxygen concentration and actual oxygen utilization efficiency.

In a continuous regenerator, all of the oxygen supplied to an upper region of the bed is consumed, since an abundant amount of coke is present. As catalyst particles move downward in the bed and coke is removed, a point is reached where less than all of the oxygen delivered is consumed. This is termed the breakthrough point. Typically, breakthrough occurs at a location spaced about half the distance down the total length of the bed in the combustion section. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and therefore the oxidation reaction occurs at a much slower rate.

In a batch regenerator, when the catalyst bed is contacted with recycle gas the coke begins to burn. Generally, the flow rate, temperature, and oxygen concentration of the recycle gas are controlled in order to produce a combustion front within the catalyst bed and to prevent the temperature of the combustion front from exceeding about 566° C. (1050° F.). Combusting coke in this manner is well known in the art of hydrocarbon processing. The combustion front passes slowly from the inlet to outlet of the catalyst bed. The intensity of coke burning and the rate of progression of the combustion front can be controlled by monitoring the temperature at various locations within the bed or the bulk temperature of the flue gas stream leaving the bed.

After the combustion step, the regeneration zone will usually include additional treatment steps or sections for the catalyst. One such step is a halogenation step. The halogenation step provides the means of incorporating and maintaining the desired level of halogen in the final catalytic composite. The halogen adjustment step employs a halogen, or halogen-containing compound in air or an oxygen atmosphere. The preferred halogen for incorporation into the catalytic composite is chlorine. The preferred halogen or halogen-containing compound utilized during the halogenation step is chlorine, HCl or a precursor of these compounds. An oxygen atmosphere is generally employed and desired in carrying out the halogenation step. The presence of oxygen aids in the dispersion of the metallic catalyst components on the carrier. A lower water concentration in the environment of the combustion section can facilitate the halogenation step as catalyst with a lower water content drop downward into the halogenation section of the regeneration zone. The concentration of chlorine in the halogenation section is governed by the Deacon equilibrium equation.

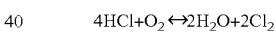

$$4HCl + O_2 \leftrightarrow 2H_2O + 2Cl_2$$

Therefore, to the extent that the catalyst entering the halogenation step has a lower water concentration it will shift the equation to the right to produce more chlorine for the halogenation step. Since oxygen aids in the re-dispersion of platinum, additional benefits are obtained when the production of the oxygen-deficient make-up gas stream also produces an oxygen-enriched stream that may be passed into the halogenation step to increase the oxygen concentration and further promote the dispersion of the catalytic metal on the carrier.

After passing from the combustion step to the halogenation step, the catalyst is usually passed into a drying step or section for the removal of water formed in the combustion step and remaining on the catalyst particles. The typical arrangement for drying the particles charges a heated air stream into the drying step or section of the regeneration zone and contacts the particles in countercurrent flow. Relatively dry catalyst particles are withdrawn (6) from the bottom of the regeneration zone and the water-containing oxygen gas stream (20) flows upward out of the drying step.

The water-laden gas stream usually enters the halogenation step or section to supply the desired oxygen in the combustion section. Gas from the drying step and halogen-containing gas mix in the halogenation section and can either flow upward into the combustion step or section or be removed prior to entering the combustion section. Since the gas from the halogenation step will usually contain a relatively large water concentration, it is desirable to separately withdraw at least part of this gas stream before it enters the combustion step or section.

The coke content of catalyst exiting the combustion step is approximately 0.2% or less of the weight of the catalyst, which is herein defined as complete coke combustion notwithstanding any residual coke. Much of this residual coke is burned off in the halogenation step or, if the halogenation step is omitted, in the drying step. Were catalyst leaving the combustion step to have on it a larger amount of coke, the temperature in the step after combustion would rise to an unacceptably high value, as a result of a large heat of combustion.

As noted above, these regions of intense burning are important for complete coke removal, but are also difficult to control in a time efficient manner. Many controller devices are well known in the art in the area of chemical process control systems or programmable electronic systems. Here a controller device (22) requires a capability to combine a measured lag time for a temperature wave to travel over a regenerator zone (26), with an ability to raise inlet temperature (24) using heating means (25) while accounting for a lagging outlet temperature response. Linear temperature ramping or substantially linear ramping, where some shift in slope is permitted as the ramping step begins and/or approaches completion, provides excellent results. Other ramping functions are also possible, including hyperbolic or exponential functions. Initial slope is generally determined as the ratio of the temperature difference of the final target outlet temperature and the initial inlet temperature, to the time period between the time requirement for complete coke combustion (initially determined by a catalyst with similar coke content but without temperature ramping if possible) and the time calculated for starting the inlet temperature ramping. Note that the final target outlet temperature is about equal to the final target inlet temperature when coke combustion has completed.

Future determinations of the time requirement for complete coke combustion can be iteratively based on prior completed combustion steps until a minimum burn time and heat-up time are obtained with similar coke content on the spent catalyst. In other words, the time for an initial effect to reach the outlet can be combined with a final effect to reach the outlet, such that the outlet approximately matches the inlet, and these lag and response times can be subsequently optimized.

Optionally, a controller device (22) will also be able to monitor oxygen concentration in a recycle gas. Typically, the completion of coke burn is measured with a combination of bed temperature or change in oxygen concentration. Once satisfactory burn criteria have been met, such as an outlet bed temperature drop of about 3° C. or more, a proof burn is conducted by increasing the regenerator temperature or the oxygen concentration. However, the measurement of the parameters outside the regenerator to set criteria for end of burn require scrutiny in order to avoid regenerator outlet temperature dropping below the peak burn temperature or outlet oxygen concentration increasing, which reflects dropping oxygen utilization. Dropping outlet temperatures require additional lag time to wait for increases in inlet temperature to correspondingly move down the regenerator. Faster response times can be expected from increasing oxygen concentration, but a small increase in concentration can lead to a significant increase in peak burn temperature. Some beds have low flow areas where oxygen in the effluent can increase, while the low flow area continues to consume all of the available oxygen, thus making controlled peak burning difficult over the entire bed by merely controlling inlet and outlet oxygen concentrations. Therefore, it is preferred to control inlet bed and outlet temperatures, generally while maintaining substantially constant oxygen concentration to avoid uncontrolled peak burning and permanent catalyst damage.

EXAMPLE

The following example is presented only to illustrate certain specific embodiments of the invention, and should not be construed to limit the scope of the invention as set forth in the claims. There are many possible other variations, as those of ordinary skill in the art will recognize, within the spirit of the invention.

Figure 1:
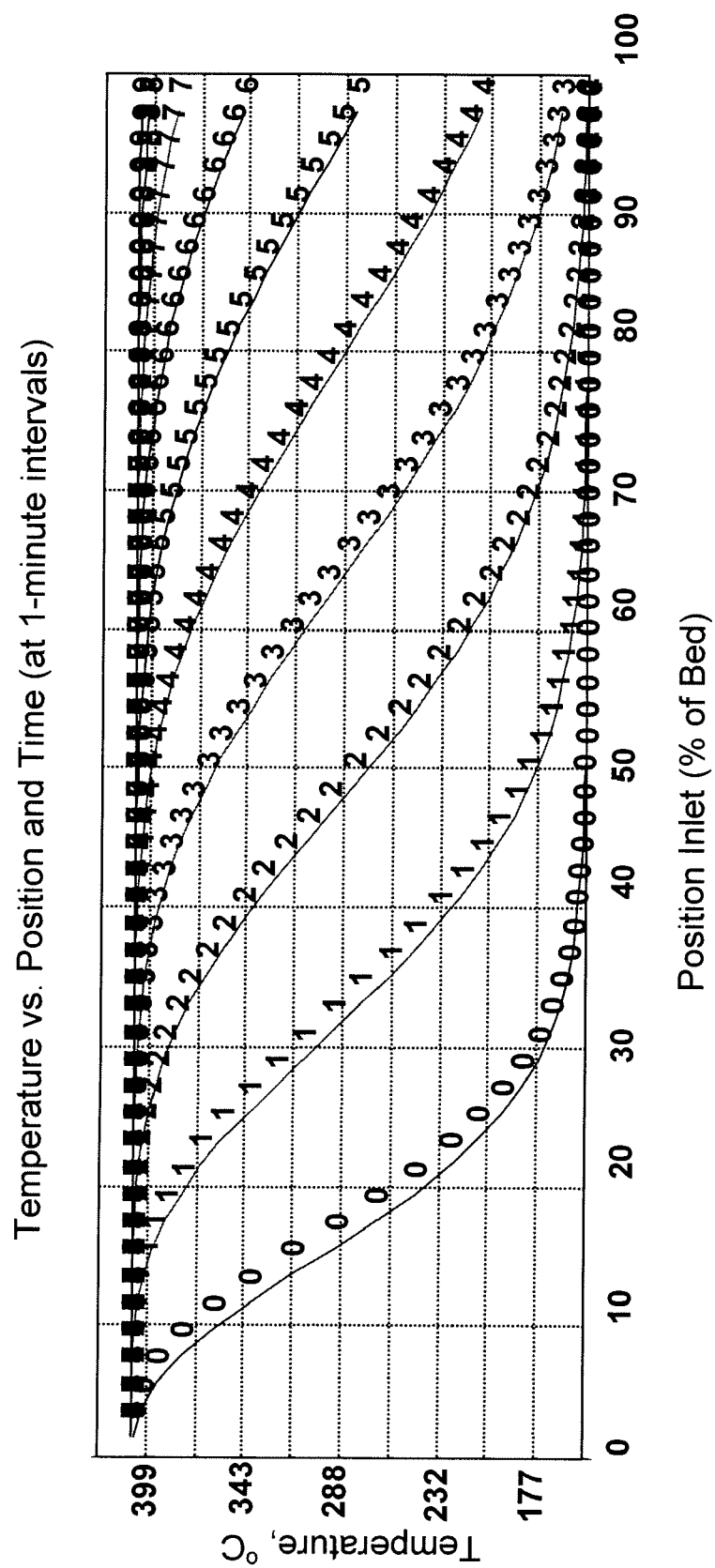
FIG. 1 shows typical heat transfer profiles traveling axially through a catalyst bed at one minute intervals for bed heat-up prior to combustion.

The lag time can be estimated from the heat up step for regenerator preceding the burn step. It takes some time until the changes of inlet vapor temperature impacts the temperature at the outlet. A typical heat up curve is shown in FIG. 1 to heat up a regenerator from 149 to 407° C. using an inert gas stream containing at most only insubstantial amounts of oxygen. Here an insubstantial amount of oxygen is an amount less than 0.2 vol-%.

FIG. 1 shows a calculation of heat-up temperature waves traveling axially through a bed of catalyst at one minute intervals. This graphically illustrates the lag time required for a change in temperature at the inlet of the bed, to reach the outlet of the bed. FIG. 1 shows that it may be more than 2 to 3 minutes for this particular bed for an impact to reach the outlet. This lag time is dependant upon relative gas flow rate, gas heat capacity, solid mass, and solid heat capacity in the bed, and can be measured from an existing regenerator zone and used to predict the starting point for inlet temperature ramping. Note that the ultimate time for the outlet to reach the inlet temperature is shown to be about 8 minutes.

Once the bed is heated up to the burn temperature, then the oxygen containing gas is introduced to begin the burn step. The oxygen content was calculated at about 1 vol-% for this bed. FIGS. 2 thru 5 illustrate the importance of proper starting time for temperature ramping while also showing the inlet temperature and the increased outlet temperature associated with coke combustion. Without any temperature ramping step the temperature at the outlet starts to fall in the calculated bed after about 91 minutes into the burn step the oxygen efficiency is calculated to be as low as 70% based on the extra time required to assure complete combustion at a constant inlet temperature such as 407° C.

Figure 2:
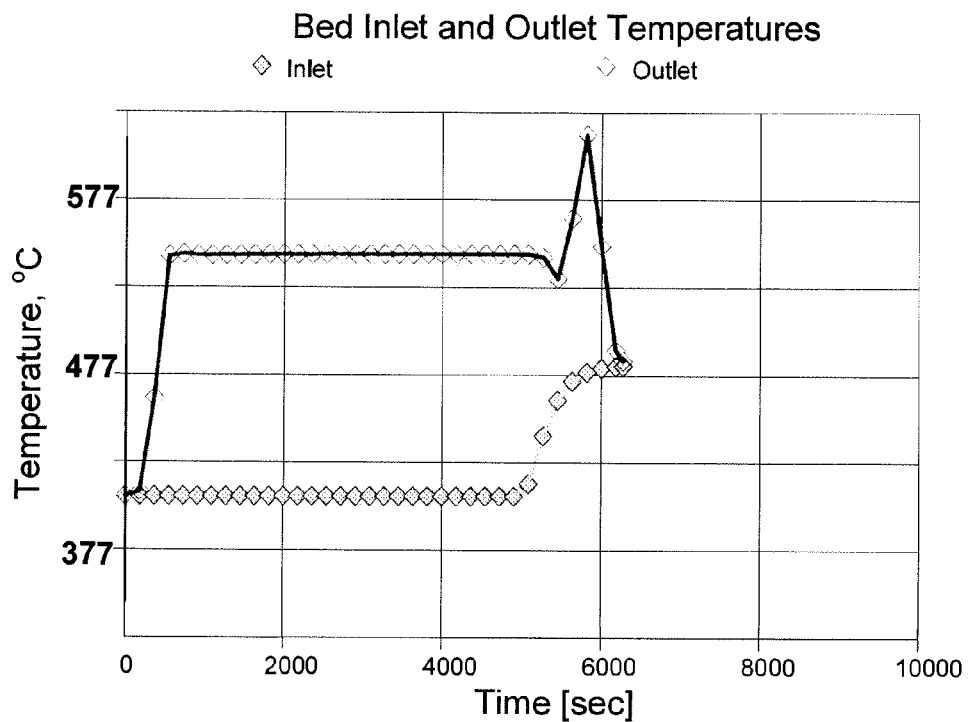
FIG. 2 shows inlet and outlet temperatures for a bed during combustion where temperature is ramped at about 83 minutes.
Figure 3:
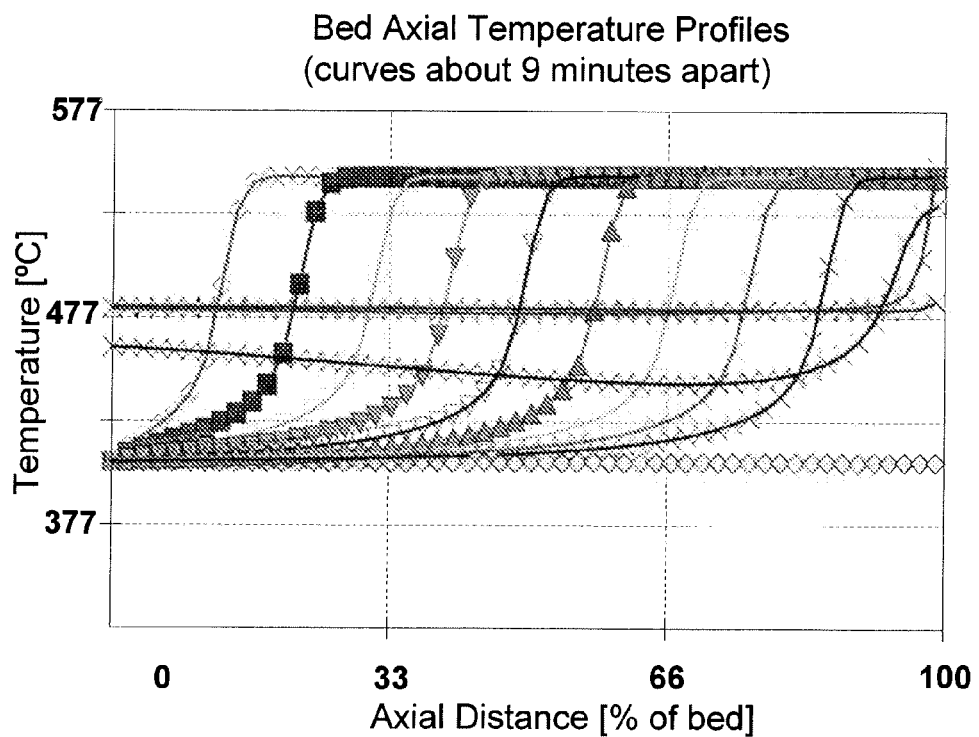
FIG. 3 shows axial bed profiles during combustion where temperature is ramped at about 83 minutes.

With an inlet temperature ramping step then the oxygen efficiency is calculated as high as 96% based on the increased kinetics of burning coke at a higher temperature such as 482° C. However, if ramping starts too early, a temperature excursion will occur due to undesirable peak burning as shown in FIG. 2, where a substantially linear ramp up occurs at 83 minutes over a period of 18 minutes and the normal peak burn temperature at the end of the combustion is greatly exceeded. FIG. 3 shows the axially traveling heat waves at about 9 minute intervals. Thus, oxygen utilization improved but permanent damage has been done to the catalyst as a result of the temperature excursion, as illustrated in FIG. 2 near 6000 second mark. The temperature ramping step in this instance was performed to soon, and even before the outlet temperature started to drop.

Figure 4:
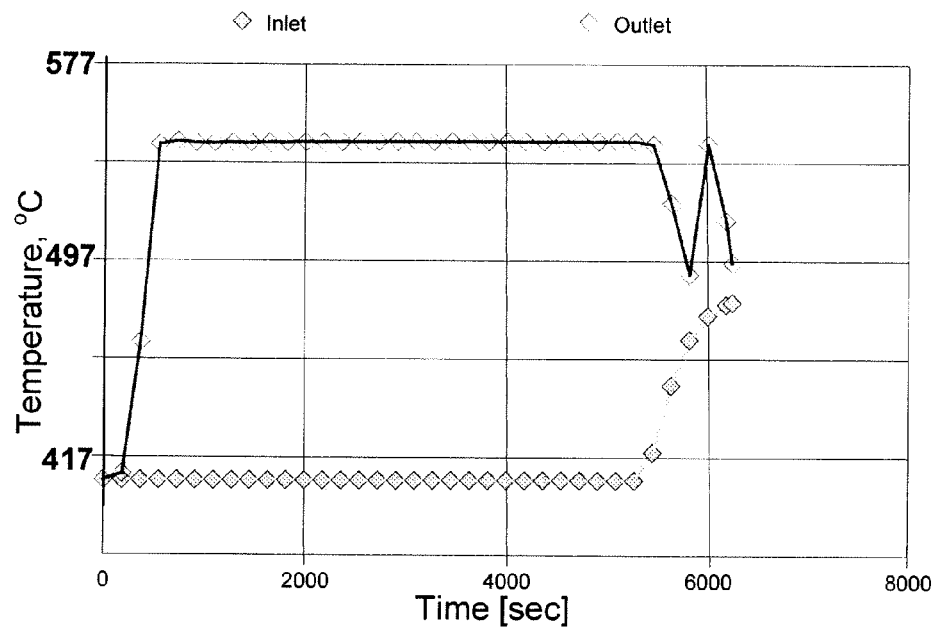
FIG. 4 shows inlet and outlet temperatures for a bed during combustion where temperature is ramped at about 89 minutes.
Figure 5:
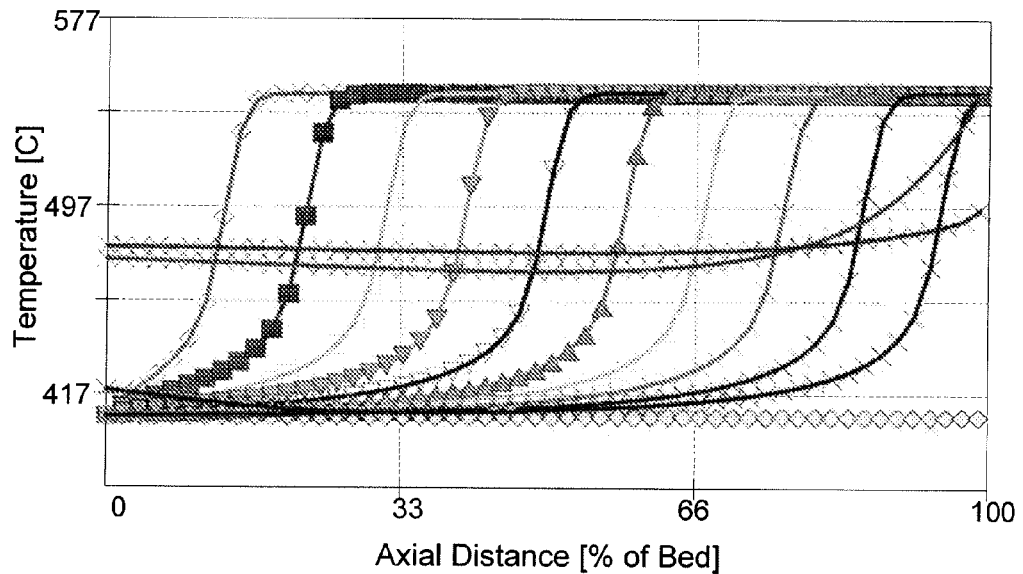
FIG. 5 shows axial bed profiles during combustion where temperature is ramped at about 89 minutes.

In contrast to FIG. 2, FIG. 4 shows a change in start time for temperature ramping from 83 minutes in FIG. 2 to 89 minutes in FIG. 4 and the normal peak burn temperature by the end of combustion is not exceeded in FIG. 4. FIG. 5 shows the axially traveling heat waves at about 9 minute intervals. Thus, improved oxygen efficiency is combined with an improved catalyst life indirectly achieved by avoiding undesirable excursions in peak burn temperature. Here the temperature ramping step was performed closer to when the outlet temperature started to drop, and thus provided a better adjustment for the lag time for a heat wave to travel through the bed.

Note that in all cases, the oxygen content in the recycle gas during combustion was calculated to be substantially constant at approximately 1 vol-% oxygen. The term "substantially constant" here refers to normal variations in measurement and supply not greater than normally expected. Also the temperature ramp was conducted with an 18 minute increase from 407 to 482° C., and the outlet temperature eventually reached the inlet temperature once coke combustion has completed, although FIG. 4 does not show this final point. Convergence of inlet and outlet temperatures signals completion of coke combustion, and substantially equal temperatures is defined to be within about a 10° C. range.

The invention claimed is:

1. An apparatus system for effecting the fixed bed regeneration of catalyst particles used in the conversion of hydrocarbons, which comprises in combination:
    (a) a reaction zone comprising at least one vessel for contacting a fresh catalyst with a hydrocarbon stream and a recycle hydrogen gas stream to form a coked catalyst;
    (b) a plurality of individual means to the reactor zone for adding and withdrawing catalyst, hydrocarbons, and recycle hydrogen gas respectively to and from the reactor zone;
    (c) a regeneration zone comprising at least one vessel for combusting the coked catalyst with a recycle oxygen gas stream to form the fresh catalyst;
    (d) a plurality of individual means to the regeneration zone for adding and withdrawing catalyst and recycle oxygen gas respectively to and from the regeneration zone;
    (e) a heating means for raising the temperature of the recycle oxygen gas at an inlet to the regeneration zone sufficiently to begin combusting coke from the catalyst;
    (f) a device for measuring a lag time for an outlet temperature to respond to and ultimately reach about the same value as an inlet temperature to the regeneration zone; and
    (g) a controller device for ramping the inlet temperature with the heating means of step (e) using the measured lag time of step (f) in conjunction with a measurement of a change in the outlet temperature to complete combusting coke from the catalyst, said controller device optionally capable of detecting an outlet oxygen concentration.

2. The apparatus system of claim 1 wherein the catalyst from step (g) is withdrawn through a conduit means from the regeneration zone and added to the reactor zone in a batch or at least semi continuous flow.

3. The apparatus system of claim 1 wherein the heating means of step (e) raises the inlet temperature to a range of about 370° to about 550° C.

4. The apparatus system of claim 1 wherein the device of step (f) measures the lag time during an initial heating period prior to beginning combustion of coke.

5. The apparatus system of claim 1 wherein the controller device of both steps (f) and (g) form an integrated controller device.

6. The apparatus system of claim 5 wherein the controller device of step (g) uses a temperature change of greater than 3° C. as the change in outlet temperature.

7. The apparatus system of claim 1 wherein the controller device of step (g) substantially linearly ramps temperature.

8. The apparatus system of claim 7 further characterized in that the controller device of step (g) linearly ramps temperature to a maximum of about 600° C.

9. The apparatus system of claim 1 further characterized in that the reaction zone of step (a) is a catalytic reforming reaction zone.

10. The apparatus system of claim 1 wherein at least part of the means of step (d) permits gas to flow axially through the catalyst.

* * * * *